United States Patent [19]

Guarino

[11] Patent Number: 5,843,500

[45] Date of Patent: *Dec. 1, 1998

[54] BACON WRAPPED SEAFOOD PACKAGE AND PROCESS

[75] Inventor: Nicholas A. Guarino, Roatan, Honduras

[73] Assignee: Carnival Brand Seafood Company, Fort Lauderdale, Fla.

[ * ] Notice: The term of this patent shall not extend beyond the expiration date of Pat. No. 5,817,353.

[21] Appl. No.: 775,500

[22] Filed: Dec. 31, 1996

Related U.S. Application Data

[63] Continuation-in-part of Ser. No. 637,610, Apr. 25, 1996.

[51] Int. Cl.⁶ .................................................... B65B 29/08
[52] U.S. Cl. ................................ 426/91; 426/90; 426/92; 426/124; 426/129; 426/274; 426/421; 426/393; 426/396; 53/449
[58] Field of Search ................................ 426/90, 92, 124, 426/129, 396, 643, 107, 113, 114, 234, 393, 412, 274, 421, 91; 53/449

[56] References Cited

U.S. PATENT DOCUMENTS

| | | |
|---|---|---|
| 2,776,216 | 1/1957 | Thomas . |
| 3,692,545 | 9/1972 | Moore ..................................... 426/129 |
| 3,780,196 | 12/1973 | Domecki ................................ 426/393 |
| 4,141,487 | 2/1979 | Faust et al. . |
| 4,230,729 | 10/1980 | Hoelzel, Jr. . |
| 4,425,368 | 1/1984 | Watkins . |
| 4,456,164 | 6/1984 | Foster et al. . |
| 4,571,337 | 2/1986 | Cage et al. . |
| 4,798,728 | 1/1989 | Sugisawa et al. . |
| 4,835,942 | 6/1989 | Skrmetta . |
| 4,839,180 | 6/1989 | Standerwick et al. . |
| 4,873,101 | 10/1989 | Larson et al. . |
| 4,933,526 | 6/1990 | Fisher et al. . |
| 4,948,605 | 8/1990 | Lambert, Jr. . |
| 4,954,356 | 9/1990 | Kappes . |
| 4,964,507 | 10/1990 | Chen . |
| 5,044,777 | 9/1991 | Watkins et al. . |
| 5,085,879 | 2/1992 | Elbaz ..................................... 426/396 |
| 5,247,149 | 9/1993 | Peleg . |
| 5,256,434 | 10/1993 | Conway . |
| 5,345,069 | 9/1994 | Grindrod . |
| 5,431,938 | 7/1995 | Kou . |
| 5,457,939 | 10/1995 | Bardou et al. . |
| 5,473,866 | 12/1995 | Maglecic et al. . |

FOREIGN PATENT DOCUMENTS

| | | |
|---|---|---|
| 1258357 | 2/1960 | France . |
| 2483190 | 12/1981 | France . |
| 58-98058 | 6/1983 | Japan . |
| 59-106253 | 6/1984 | Japan . |
| 61-199764 | 9/1986 | Japan . |
| 62-244340 | 10/1987 | Japan . |
| 2121752 | 1/1984 | United Kingdom . |

OTHER PUBLICATIONS

Meta Given's Modern Encyclopedia of Cooking, J. G. Ferguson Publ. Co., vol. 1, 1969, See pp. 201, 202.
Chemistry and Industry (3), 114, 1990 (See Dialog Abstract).
Vleesdistributie En Vleestechnologie 26(5), 35+26, 1991 (Dialog Abstract).
International Food Ingredients (6), 32–33, 1991 (Dialog Abstract).
North American New Product Report (11) May 28, 1993, pp. 13, 15 (Dialog Abstract).
Modern Packaging Jan. 1955, p. 79 Plus.

*Primary Examiner*—Steven Weinstein
*Attorney, Agent, or Firm*—Quarles and Brady

[57] ABSTRACT

A process and packaging for shrimp, bacon wrapped, and coated in sauce, in which the product is vacuum sealed within packaging before being flash frozen for shipping and storage.

32 Claims, 3 Drawing Sheets

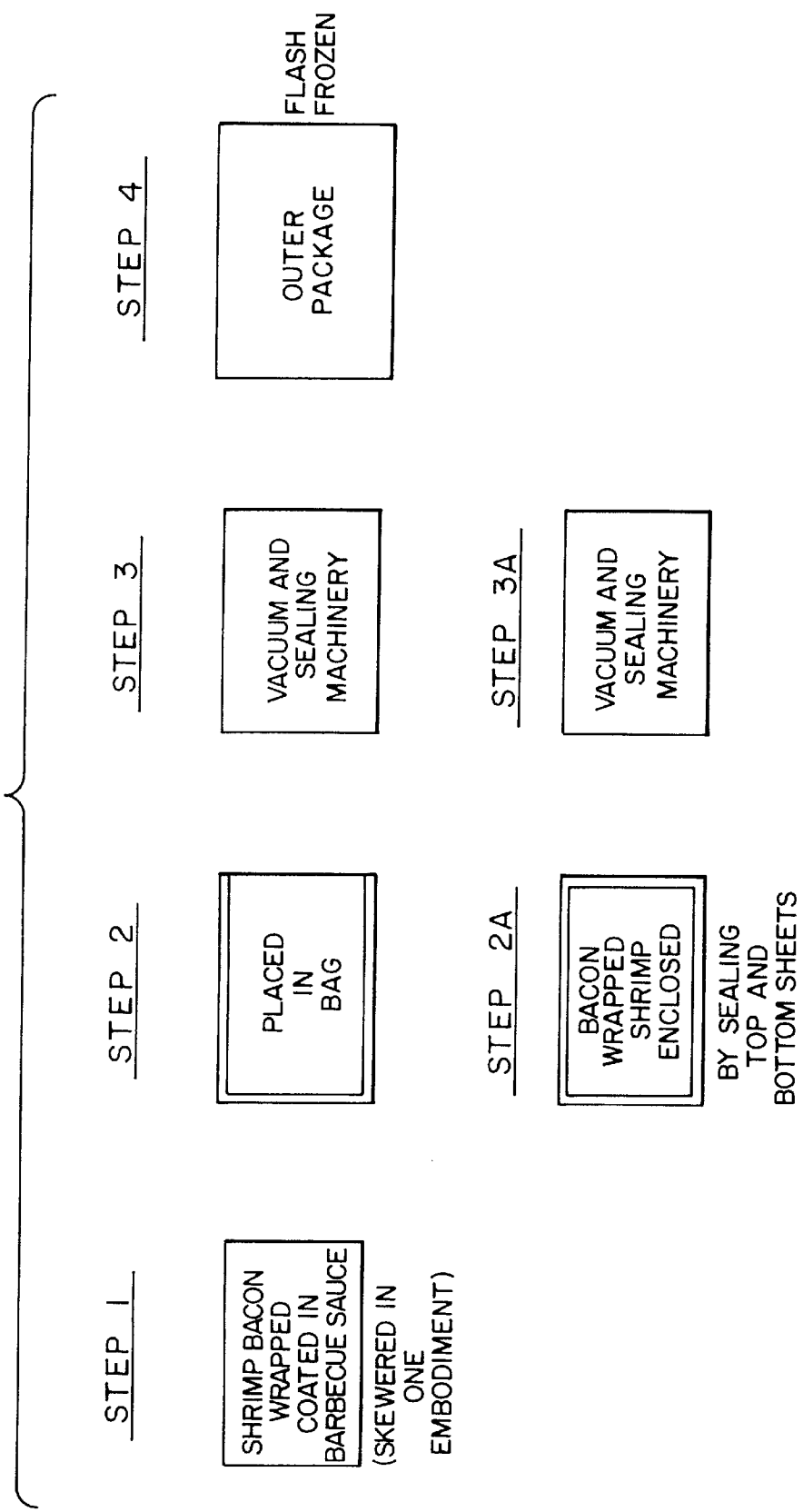

BACON WRAPPED SEAFOOD PACKAGE AND PROCESS

CROSS-REFERENCE TO RELATED APPLICATION

This application is a continuation-in-part of U.S. Ser. No. 08/637,610, filed Apr. 25, 1996.

BACKGROUND OF THE INVENTION

Heretofore, packaging of seafood in vacuum packed containers has not been extended to include certain combination delicacies such as bacon-wrapped barbecued shrimp which are frozen, once packed, for shipment and storage purposes.

With vacuum packaging of any seafood product, there has been significant concern with the potential of mold, yeast, bacteria, especially botulism. Prior to the development at hand, seafood companies have not successfully produced a product comparable to that disclosed herein. Processes have been tried before to eliminate the threat of botulism. Examples of such processes are nitrogen flushing and radiation. Notwithstanding these attempts, success has not previously been obtainable, primarily because of problems associated with the integrity of the packaging leading to health issues such as botulism.

While vacuum sealing has been successfully used for packaging shellfish without the shells and other fish in bulk, packing seafood coated in sauces in vacuum sealed containers suitable for retail has not been successfully done, explaining the absence of the use of such packaging in the marketplace. While vacuum packaging has been used for a variety of vegetables and meats, this usage has not extended successfully to retail packaging of seafood.

An example of vacuum packaging technique of food stuffs generally is found in U.S. Pat. No. 5,473,866. A seafood vacuum pack system is disclosed in U.S. Pat. No. 4,835,942 but with respect to packing technique, this patent teaches away from the subject invention in that shrimp are intentionally stacked one above the other at the periphery of the packages. Likewise, U.S. Pat. No. 4,964,507 teaches the use of a "protruding-up curved section" of a case which is also contrary to the packing technique of to the subject invention. Neither of these latter patents disclose any use of prepared delicacies such as bacon-wrapped barbecued shrimp which are prepared, and subsequently vacuum packed.

SUMMARY OF THE INVENTION

Accordingly, the subject invention is directed to packaging which permits the vacuum packaging of bacon-wrapped barbecued shrimp to enable the packaged product to be presented to consumers in attractive packaging while maintaining the integrity of the vacuum packaging to provide a packaged product which can be shipped and stored until use. The shrimp are bacon-wrapped, coated with barbecue sauce, and may be skewered prior to being vacuum sealed and flash frozen.

It is therefore an object of the subject invention to provide a vacuum packaging process and the packaging to enable bacon-wrapped barbecue shrimp and similar delicacies to be safely packaged, and subsequently flash frozen for shipping and storage purposes.

It is a further object of the subject invention to provide a process and packaging to present shrimp prepared in various ways to the consumer in retail packaging heretofore unknown to the consumer.

It is a related object to provide a process by which seafood is vacuum packed with additional ingredients such as bacon and barbecue sauce, flash frozen, and subsequently distributed.

It is still a further object of the subject invention to provide bacon-wrapped barbecue shrimp in desirable packaging to promote favorable product appearance.

It is one more object of the subject invention to develop a packaging process whereby concerns of spoilage, botulism, mold, yeast, and bacteria are effectively minimized.

It is still another object of the subject invention to provide a process and packaging of shrimp specialty products in a cost efficient manner.

It is but one more object of the subject invention to provide a process and packaging to permit the packaging of prepared shrimp which can be seen by the consumer upon purchase.

In compliance with the above objects, shrimp is vacuum packed as follows. If the product to be packed is bacon-wrapped barbecue shrimp, the shrimp are first bacon wrapped and then coated in barbecue sauce. A group or row of the prepared shrimp may then be skewered together and placed on a pallet in basically side by side orientation. The skewers may have the lead tip removed once the skewer has penetrated the shrimp. Both the lead portion and the trail end are left embedded in the shrimp so that the ends will not penetrate the wrapping once the shrimp are enveloped.

In an alternate embodiment, the shrimp may be individually skewered to hold the bacon in place or the bacon may be adhered to the shrimp by a binding agent. In this latter process, an animal-protein edible adhesive may be used to secure the bacon wrapping to the individual shrimp. An appropriate binding agent is known as Fibrimex and is marketed by FNA Foods, Inc. of Alberta, Canada.

Once the shrimp are placed within a bag of plastic film, which will typically be on a pallet, vacuum sealing can take place with somewhat standard and well-known equipment. Typically, a vacuum means will draw a vacuum within the filled bag and a seal jaw assembly will heat seal the bag once the air is evacuated. The vacuum-heat sealing equipment is not part of the subject invention.

The sealed bag with bacon-wrapped barbecued shrimp or other shrimp delicacy can then be placed in an outer package, preferably of cardboard, which will stabilize the bag within and present a pleasing package. The cardboard may be waxed or coated on both sides to effectively be waterproof. The outer package is designed for retail acceptance and will likely include a window so that the shrimp may be examined as contained in the inner package.

The shrimp may also be marketed in the sealed bag without the outer package. Sales information can be placed on the bottom of the pallet, which will be seen through the transparent bag or on the bag itself.

Regardless of the use or not of the outer package during the packing process, the shrimp are wrapped in bacon as desired, covered with sauce, as desired, by spraying, dipping, coating or otherwise, in a non-frozen state. The bacon is held in place by gluing or skewering. Upon being packed as disclosed herein, the shrimp as wrapped and coated, are immediately flash frozen, using any of several commercial techniques, such as, but not limited to, blast freezing, contact freezing or tunnel freezing, and marketed in such frozen state.

It is contemplated that the packaged seafood remain in a frozen state through distribution, retail, etc. until approximate time of consumption. The shrimp can then be removed and grilled or otherwise cooked.

BRIEF DESCRIPTION OF THE DRAWINGS

FIG. 4 shows the steps of the process by which the shrimp is bacon wrapped, coated in sauce, optionally skewered, vacuum packaged, and flash frozen, according to the steps of the subject invention.

DETAILED DESCRIPTION OF THE PREFERRED EMBODIMENTS

Figure 1:
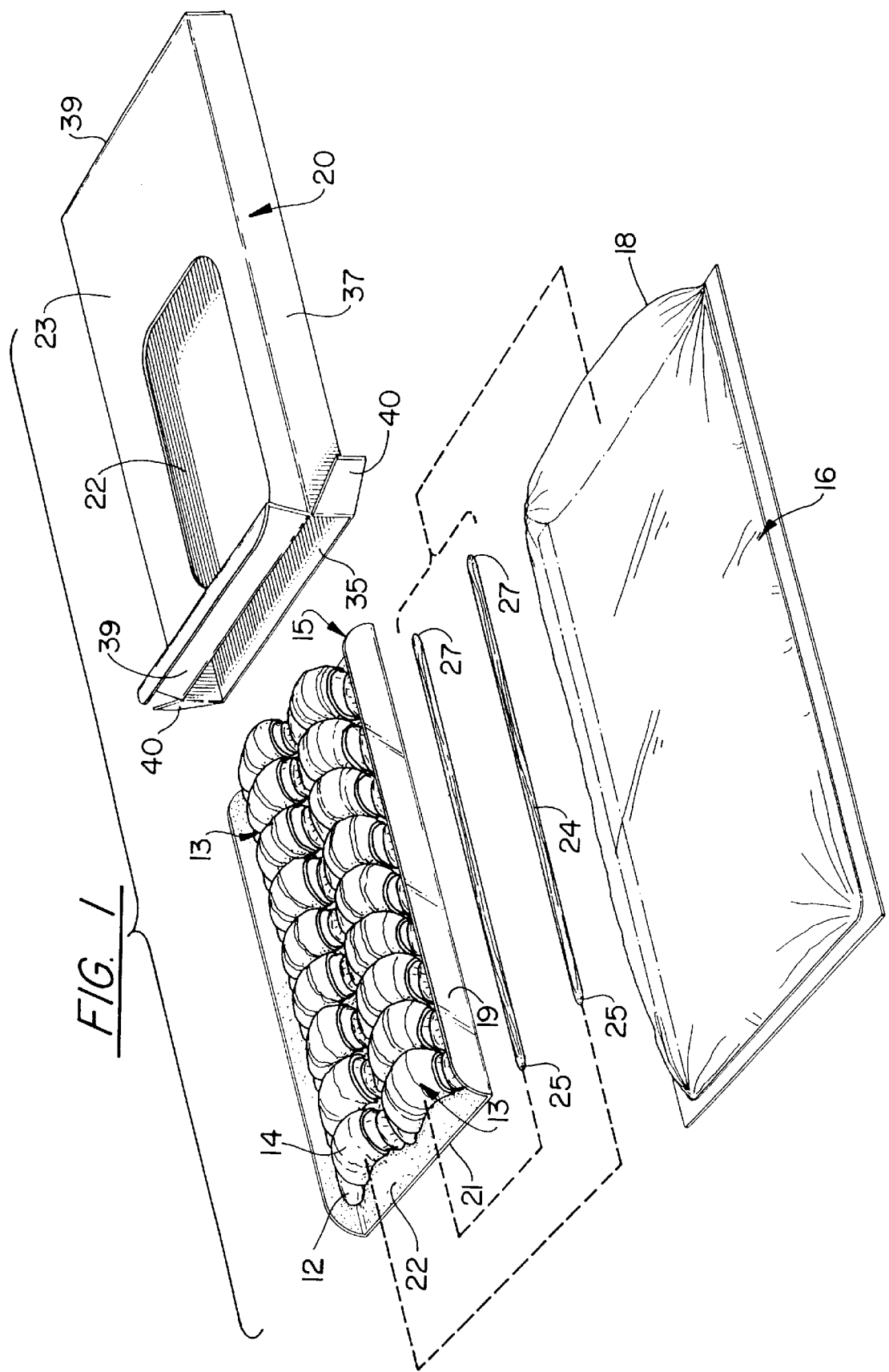
FIG. 1 is a sequential perspective view showing shelled shrimp, bacon wrapped and coated in sauce to be skewered (optional) and then positioned on a pallet, with the inner packaging to cover and seal the shrimp and the outer container to receive the packaged shrimp.

Seafood such as shrimp 12 are deveined and shelled, wrapped in bacon 14, coated or otherwise prepared in sauce, and optionally impaled upon skewers 24, as can be appreciated from the layout in FIG. 1.

The bacon-wrapped, barbecued shrimp 12 can be either skewered, in which case it is the skewer 24 that holds the bacon wrapping 14 to the shrimp 12, or the bacon 14 may be "binded" to the shrimp 12 by a binding system. In this latter situation, an animal-protein glue such as the natural meat binding system known as Fibrimex® is used to secure the bacon wrapping 14 to the individual shrimp 12. In the Fibrimex system, Fibrinogen and thrombin are properly mixed and applied to the surfaces to be binded. Following application of bacon to shrimp, Fibrimex® instructions are followed including appropriate standing time to allow the adhesive to take place. Although skewers 24 are shown in FIG. 1 in the binding embodiment the bacon wrapped shrimp 13 will be as they appear without the skewers 24 being used. Specifications such as thickness and temperature of the binding agents will depend on the manufacturer's instructions and do not form a part of the subject invention.

In the case where the animal/protein glue is used, the individual bacon wrappings are held to the respective shrimps by means of a skewer 24 which could be of various sizes. Each bacon wrapping 14 could be held to an individual shrimp 12 by a small skewer, or in the alternative, a half dozen or so bacon wrapped shrimp 12 could be skewered together by a longer skewer 24 (as shown).

The shrimp 12, once skewered, are placed on pallet 15 and inserted into the transparent envelope or packaging 16 as shown and slid within, after which time vacuum will be applied and the envelope or bag-like container 16 will be sealed by the processing equipment. More specifically, a vacuum is created as vacuum means (not shown) vacuumizes the bag 16 prior to the sealing of the end 18 as is standard in vacuum packaging of food stuffs.

The envelope or bag 16 containing the shrimp 12 is now ready to be placed within the outer package or container 20, having window or opening 22 for viewing the shrimp 12.

In the case where the bacon wrappings 14 are glued to the shrimp 12, the barbecue sauce is applied once the gluing step is completed. The barbecue sauce is either brushed on, manually or by machine, sprayed on manually or by machine, or the shrimp with bacon wrapping in place may be dipped into the barbecue sauce. The bacon wrapped shrimp are then placed upon pallet 15.

Upon further examination of FIG. 1, the pallet 15 will be seen to have two very different surfaces. The top surface 22 on which the shrimp 12 are positioned, is matted or roughened to prevent the shrimp 12 from sliding and becoming disoriented which will interfere with the need to have the shrimp 12 flat packed both for appearance and to prevent the penetration of the plastic film structure of envelope 16.

The bottom surface 21 is smooth, as best seen on the sides 19 which are turned up at an approximate 90 degree angle. The smoothness facilitates the handling of the pallet 15 and, in particular, the sliding of the pallet 15 within envelope 16 prior to the vacuum sealing of the envelope by sealing edge or end 18.

When the shrimp 12 are skewered with bacon wrapping in place, the barbecue sauce may be applied by dipping, spraying or brushing the sauce on, as well.

Figure 2:
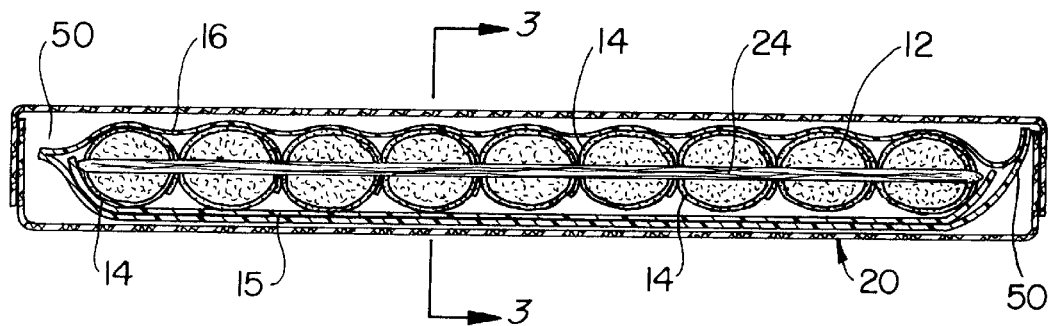
FIG. 2 is a cross sectional view along lines 2—2 of FIG. 3 taken lengthwise through the package showing packaged bacon wrapped skewered shrimp.

As best seen in FIG. 2, the shrimp 12 once peeled, deveined, wrapped in bacon 14, and marinated in barbecue sauce, are skewered on skewers 24 and placed in bag 16, which in turn is placed in box 20.

The prepared shrimp 12 will be frozen within bag 16 as will be discussed but it will be appreciated that once removed from the bag 12, the product will be ready to immediately broil or grill in skewered form.

If the envelope or bag 16 is punctured, or ruptured, storage problems can result. Accordingly, once the shrimp 12 are skewered, any pointed ends 25 of skewers 24 may be cut off to minimize the possibility of the bag 16 being punctured. The bag 16 may be of 2-ply construction comprised of polypropylene and nylon, with the nylon contributing to its strength. Equivalent material may also be used.

The skewers 24 may be designed of precise length, to penetrate the rows of shrimp 12 shown in FIG. 1 so that the ends 25, 27 of the skewers 24 are embedded in the end shrimp 13, of each row so that the skewer ends do not extend out of the end shrimp 13. This minimizes the danger of the bag 16 being punctured at any time.

As discussed above, if bacon 14 is "glued" to shrimp 12, the skewers 24 need not be used, and the shrimp 12 are individually placed on pallet 15. As can further be seen in FIGS. 1–3, once the shrimp 12 are placed within the bag 16 and sealed, the bag 16 is placed within outer package or container 20, which is preferably made of waxed cardboard or substitute. The container or cardboard box 20 basically has a top 23 and a bottom 35 portion, and sides 37. The opening 22 in top portion 23 is cut in such a way to enable the product within to be viewed.

Once the bag or package 16 is placed within outer package or container 20, the container 20 is of course closed by tucking in side flaps 40 and end flap 39.

Figure 3:
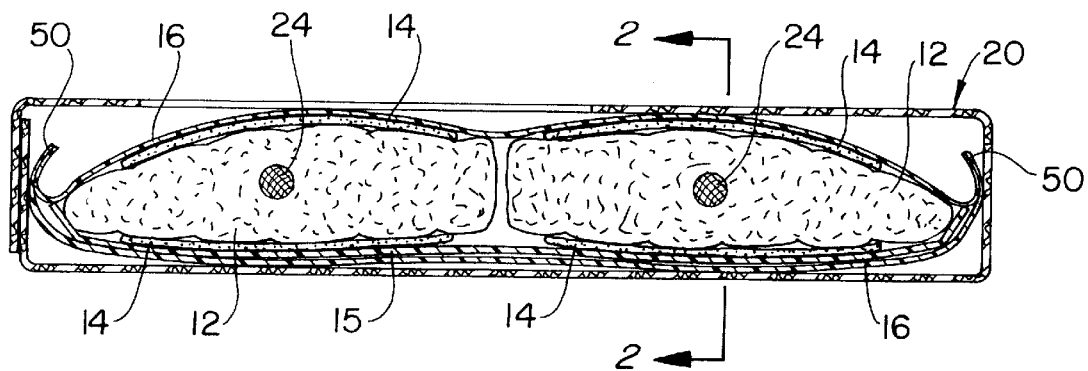
FIG. 3 is a cross sectional view widthwise taken along the lines 3—3 of FIG. 2.

As can be further seen by the complementary cross-section views in FIGS. 2 and 3, the packaged shrimp 12, once wrapped in bacon 14 and coated in barbecue sauce, are skewered by skewers 24 to hold the bacon 14 snugly in its wrapped condition around the shrimp 12.

The packaged shrimp 12 are seen within package or bag 16, which in turn is within outer package 20. Sealed edges 50 of the bag 16 can be seen tucked so as to fit snugly within the outer package 20. It is contemplated that the outer package 20 will remain in place, which serves to protect the integrity of the bag 16 until time for removal and grilling. The packages 20 will typically be stacked within the freezer compartments for compact storage where they present an attractive product for the purchasers.

With reference to FIG. 4, the key steps of the process from packing to grilling or otherwise cooking are presented. In Step 1, the shrimp 12 are wrapped in bacon 14, coated in sauce and skewered, unless by alternate embodiment the bacon is "glued" to the shrimp 12.

The shrimp 12 are placed on pallet 15 and enveloped into bag 16 as shown in Step 2.

As contemplated in Step 3, machinery well-known in packaging food stuffs can be used to create a vacuum within bag 16, sealing edge 18 in the process.

As shown in alternative Step 2A, the bacon wrapped shrimp may be placed onto a bottom sheet of plastic film and another sheet placed on top. Either sheets extending from rolls or discrete sheets can be used. The edges of top and bottom sheets will be joined together and heat sealed simultaneously with the vacuuming of the then-formed bag as represented in Step 3A, as can be accomplished by machinery known to the food packing trade. Thus steps 2A and 3A are operational steps performed really as a single step by such known machinery.

Regardless of whether steps 2–3 or 2A–3A are used, the bacon wrapped shrimp 12 which have been coated in sauce will become more flavorful as the sauce is drawn into the shrimp 12 as the vacuum is applied.

In Step 4 the sealed bag or package 16 from step 3 or 3A is placed within box or outer package 20 and the flaps 39, 40 as shown in FIG. 1, closed to complete the packing process. Step 4 can be conducted by hand or by machine, with the latter process being undertaken by packing machinery well known in the food stuffs industry.

At this juncture the packaged shrimp 12 is immediately subjected to flash freezing to preserve the quality and to prevent the formation of bacteria, mold, and yeast and botulism thus enabling the product to be shipped and sold in frozen form with greatly increased shelf life. Standard industry equipment is used to blast freeze, contact freeze or tunnel freeze the product.

It is contemplated that the shrimp 12 will remain frozen until approximate time of grilling, baking or other form of cooking. This typically will be after distribution, retail storage and home or restaurant storage. The bacon wrapped barbecued shrimp 12 on skewers 24 can then be removed from the bag 16 and grilled while on the skewers 24 so that the bacon 14 remains wrapped on the shrimp 12. Alternatively, if the bacon 14 is glued on the shrimp 12, the shrimp can be placed individually on the grill or in the oven for cooking.

In an alterative embodiment, barbecued, bacon wrapped shrimp 12 can be marketed in the package or bag 16 without being placed within the outer container 20. Sales indicia and literature may be placed within bag 16, or on a sales page inserted within the bag 16 or attached on the outside.

Viewing the overall steps from packing to removal from the freezer, the shrimp 12 are bacon wrapped, coated in sauce, optionally skewered if edible glue is not used to secure bacon to shrimp, and then vacuum packed by application of negative pressure prior to flash freezing. Once frozen, it is contemplated the product will remain frozen until close to time of grilling, following generally acceptable guidelines for dealing with frozen foodstuffs.

It will be appreciated that the bacon wrapped shrimp placed in a sauce as disclosed with respect to FIGS. 1–4 will have the sauce sticking to the shrimp 12 and bacon 14. As the vacuum is applied, the sauce will be drawn into the shrimp 12 and bacon 14 which will enhance the flavor of the product.

A variety of improvements and modifications to the packing and process disclosed herein will be apparent. Accordingly, no limitation on the invention is intended by the foregoing description and drawings.

What is claimed is:

1. A vacuumized package for bacon wrapped seafood, comprising:

a pallet;

bacon wrapped seafood positioned on said pallet in a side-by-side orientation;

a sealed bag enclosing said palletized bacon wrapped seafood under vacuum; and, wherein said pallet has a rough upper surface sufficient to restrain movement of said bacon wrapped seafood and a smooth under surface sufficient to facilitate sliding engagement of said pallet and said bag, said bacon wrapped seafood being positioned on said rough upper surface and said side-by-side orientation being such that the likelihood of said bag being penetrated or pierced by any part of said bacon wrapped seafood capable of doing so is diminished.

2. The package of claim 1, wherein said bag is formed from a plastic bag having an opening through which said palletized bacon wrapped seafood is inserted.

3. The package of claim 1, wherein said bag comprises:

a lower sheet of a plastic film onto which said palletized bacon wrapped seafood is placed; and, an upper sheet of a plastic film placed over said palletized bacon wrapped seafood so that the extremities of said lower and upper sheets extend beyond the perimeter of said pallet and sealably contact one another.

4. The package of claim 1, wherein said sealed palletized bacon wrapped seafood is flash frozen.

5. The package of claim 1, further comprising an outer container for said sealed bag.

6. The package of claim 5, wherein said outer container has an opening for viewing said bacon wrapped seafood in said sealed bag.

7. The package of claim 5, wherein said outer container is a cardboard box.

8. The package of claim 1, wherein said pallet further comprises upwardly extending sides.

9. The package of claim 1, wherein a sauce is vacuum sealed in said bag with said bacon wrapped seafood.

10. The package of claim 1, wherein said seafood is shrimp.

11. The package of claim 10, wherein a sauce is vacuum sealed in said bag with said bacon wrapped shrimp.

12. The package of claim 1, wherein said seafood is barbecued shrimp.

13. The package of claim 12, wherein a sauce is vacuum sealed in said bag with said bacon wrapped barbecued shrimp.

14. The package of claim 1, wherein said bacon is attached to said seafood about which said bacon is wrapped.

15. The package of claim 14, wherein said bacon is attached to said seafood by skewers.

16. The package of claim 14, wherein said bacon is attached to said seafood by an edible glue.

17. A process for packaging bacon wrapped seafood, comprising the steps of:

placing bacon wrapped seafood in a side-by-side orientation on a pallet;

enclosing said palletized bacon wrapped seafood in a bag with a sliding engagement;

applying a vacuum to said bag and said palletized bacon wrapped seafood;

sealing said bag and the enclosed palletized bacon wrapped seafood under said vacuum; and, wherein said pallet has a rough upper surface sufficient to restrain movement of said bacon wrapped seafood and a smooth under surface sufficient to facilitate said sliding engagement of said pallet and said bag, said bacon wrapped seafood being placed on said rough upper surface and said side-by-side orientation being such that the likelihood of said bag being penetrated or pierced by any parts of the bacon wrapped seafood capable of doing so is diminished.

18. The process of claim 17, wherein said enclosing step comprises the steps of:

forming said bag from a plastic bag having an opening; and, inserting said palletized bacon wrapped seafood into said bag through said opening.

19. The process of claim 17, wherein said enclosing step comprises the steps of:

placing said palletized bacon wrapped seafood onto a lower sheet of a plastic film; and, placing an upper sheet of a plastic film over said palletized bacon wrapped seafood so that the extremities of said lower and upper sheets extend beyond the perimeter of said pallet.

20. The process of claim 19, wherein said sealing step comprises sealing said extremities of said upper and lower sheets to one another.

21. The process of claim 17, further comprising the step of flash freezing said vacuumized palletized bacon wrapped seafood in said sealed bag.

22. The process of claim 17, further comprising the step of placing the sealed bag within an outer carton.

23. The process of claim 22, wherein said outer carton has an opening for viewing the seafood in the sealed bag.

24. The process of claim 22, wherein said outer carton has upwardly extending sides.

25. The process of claim 17, further comprising the step of including a sauce with said bacon wrapped seafood in said bag.

26. The process of claim 17, wherein said seafood is shrimp.

27. The process of claim 26, further comprising the step of including a sauce with said bacon wrapped shrimp in said bag.

28. The process of claim 17, wherein said seafood is barbecued shrimp.

29. The process of claim 28, further comprising the step of including a sauce with said bacon wrapped barbecued shrimp in said bag.

30. The process of claim 17, further comprising the step of attaching said bacon to said seafood about which said bacon is wrapped.

31. The process of claim 30, wherein said bacon is attached to said seafood by skewering.

32. The process of claim 30, wherein said bacon is attached to said seafood with an edible glue.

* * * * *